(12) United States Patent
Diewald et al.

(10) Patent No.: US 9,280,344 B2
(45) Date of Patent: Mar. 8, 2016

(54) REPEATED EXECUTION OF INSTRUCTION WITH FIELD INDICATING TRIGGER EVENT, ADDITIONAL INSTRUCTION, OR TRIGGER SIGNAL DESTINATION

(71) Applicant: TEXAS INSTRUMENTS INCORPORATED, Dallas, TX (US)

(72) Inventors: Horst Diewald, Freising (DE); Johann Zipperer, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 681 days.

(21) Appl. No.: 13/628,369

(22) Filed: Sep. 27, 2012

(65) Prior Publication Data

US 2014/0089641 A1   Mar. 27, 2014

(51) Int. Cl.
*G06F 9/30* (2006.01)
*G06F 9/38* (2006.01)

(52) U.S. Cl.
CPC ........ *G06F 9/30065* (2013.01); *G06F 9/30145* (2013.01); *G06F 9/3885* (2013.01)

(58) Field of Classification Search
CPC .............................. G06F 9/30065; G06F 9/325
See application file for complete search history.

(56) References Cited

U.S. PATENT DOCUMENTS

| 3,665,402 | A  | * | 5/1972  | Greenspan et al. | 712/241 |
| 5,303,355 | A  | * | 4/1994  | Gergen et al.    | 712/241 |
| 6,832,296 | B2 | * | 12/2004 | Hooker           | 711/137 |
| 2006/0107028 | A1 | * | 5/2006 | Meuwissen et al. | 712/241 |

\* cited by examiner

*Primary Examiner* — Kenneth Kim
(74) *Attorney, Agent, or Firm* — Gregory J. Albin; Frank D. Cimino

(57) ABSTRACT

A processor includes a plurality of execution units. At least one of the execution units is configured to repeatedly execute a first instruction based on a first field of the first instruction indicating that the first instruction is to be iteratively executed.

24 Claims, 3 Drawing Sheets

REPEATED EXECUTION OF INSTRUCTION WITH FIELD INDICATING TRIGGER EVENT, ADDITIONAL INSTRUCTION, OR TRIGGER SIGNAL DESTINATION

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution unit providing iterative execution at the instruction level are disclosed herein. In one embodiment, a processor includes a plurality of execution units. At least one of the execution units is configured to repeatedly execute a first instruction based on a first field of the first instruction indicating that the first instruction is to be iteratively executed.

In another embodiment, an execution unit for executing instructions in a processor includes instruction execution logic. The instruction execution logic is configured to extract a first value from a first instruction to be executed by the execution unit, and to determine based on the value whether the first instruction is to be repeatedly executed. The instruction execution logic is further configured to repeatedly execute the first instruction based on a result of the determination.

In yet another embodiment, a method for executing instructions in an execution unit of a processor includes extracting, by the execution unit, a first value from a first instruction to be executed by the execution unit. Based on the value, the execution unit determines whether the first instruction is to be repeatedly executed. Based on a result of the determining, the execution unit repeatedly executes the first instruction.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
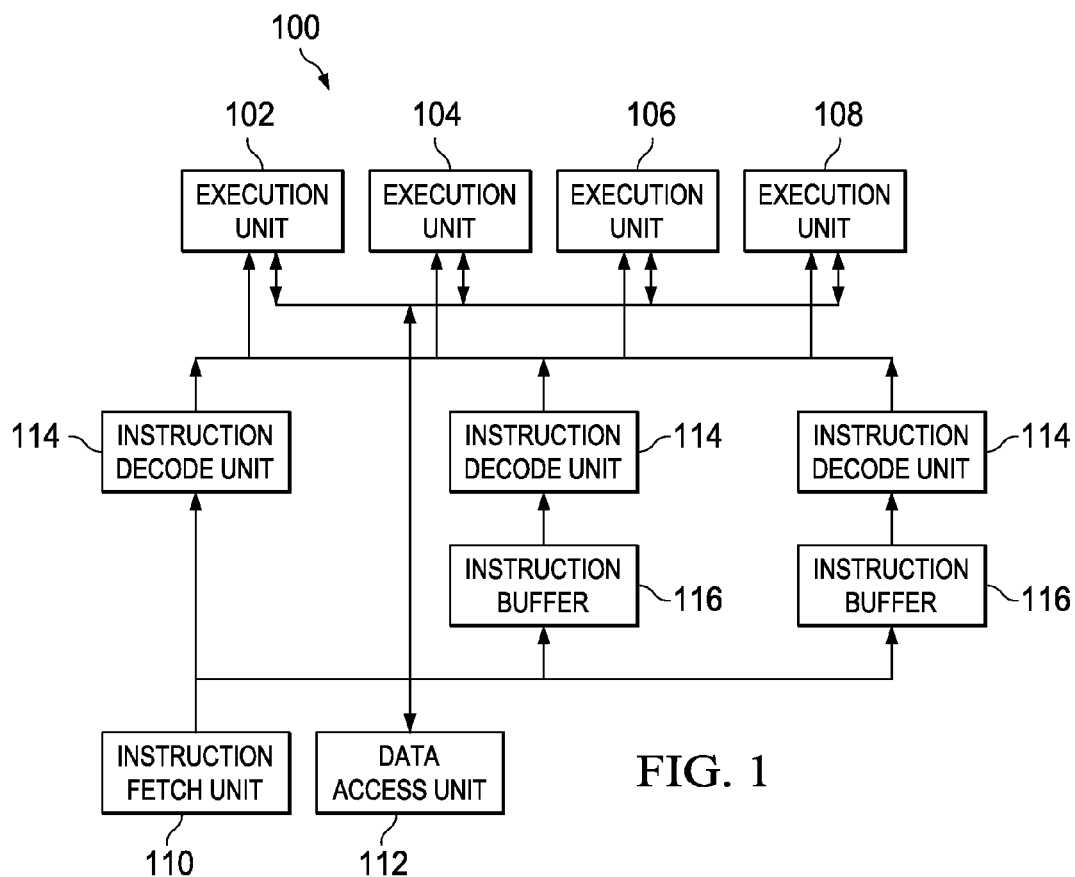
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Execution units implemented in various processor architectures may require one or more instruction cycles to execute an instruction. For example, a reduced instruction set architecture may execute simple instructions in a single instruction cycle, while a complex instruction set architecture may execute complex instructions in a plurality of instruction cycles. Inclusion of execution units configured to execute complex instructions allows for efficient provision of complicated functionality.

The computational procedures executed using processors often employ repeated or iterative execution of one or more instructions. In conventional processors, iterative execution is controlled via execution of instruction flow change instructions, such as jump or branch, or alternatively, by execution of a repeat instruction that specifies iterative execution of a subsequent instruction.

Embodiments of the execution units disclosed herein execute instructions wherein each instruction may specify whether the instruction is to be repetitively executed. Thus, embodiments provide iterative execution without the use of additional flow control instructions that consume instruction storage space. Furthermore, embodiments of the execution units may trigger initiation and/or termination of such instructions based on an event or condition occurring in a processor. Consequently, embodiments of the execution units are capable of a higher degree of autonomy than convention execution units. Such autonomy can require activation of few processor components to provide a function than is required in conventional processor architectures, and correspondingly, provide power savings when applied in signal processing and other systems.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. The processor 100 may also include other components and sub-systems that are omitted from FIG. 1 in the interest of clarity. For example, the processor 100 may include data storage resources, such as random access memory, communication interfaces and peripherals, timers, analog-to-digital converters, clock generators, debug logic, etc.

One or more of the execution units 102-108 can execute a complex instruction. For example, an execution unit (EU) 102-108 may be configured to execute a fast Fourier transform (FFT) instruction, execute a finite impulse response (FIR) filter instruction, an instruction to solve a trigonometric function, an instruction of evaluate a polynomial, an instruction to compute the length of a vector, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may stall until the execution unit 104 has produced the required result. One execution unit, e.g., a primary execution unit, may provide instructions to, or otherwise control the instruction execution sequence of, another execution unit.

To facilitate iterative execution of an instruction, or a group of instructions, the execution units 102-108, identify, based on a field of the instruction, whether the instruction is to be repeatedly executed and a number of iterations of the instruction to be executed. Embodiments of the execution units 102-108 may further recognize, based on a field of the instruction, a trigger event the occurrence of which initiates and/or terminates execution of the instruction, a source of the trigger event, etc. The execution units 102-108 may also generate a signal indicating initiation, termination, or other state of execution of the instruction and provide the signal to a destination indicated via a field of the instruction. Thus, embodiments of the execution units 102-108 may initiate repeated execution of one or more instructions based on a received trigger signal and on completion of processing provide trigger signal to a different component of the processor 100, an external component, etc. to initiate additional processing.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all or a plurality of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in a low power state. Thus, each execution unit 102-108 is able to independently control access to resources of the processor 100 (power, clock frequency, etc.) external to the execution unit needed to execute instructions, and to operate independently from other components of the processor 100.

Figure 2:
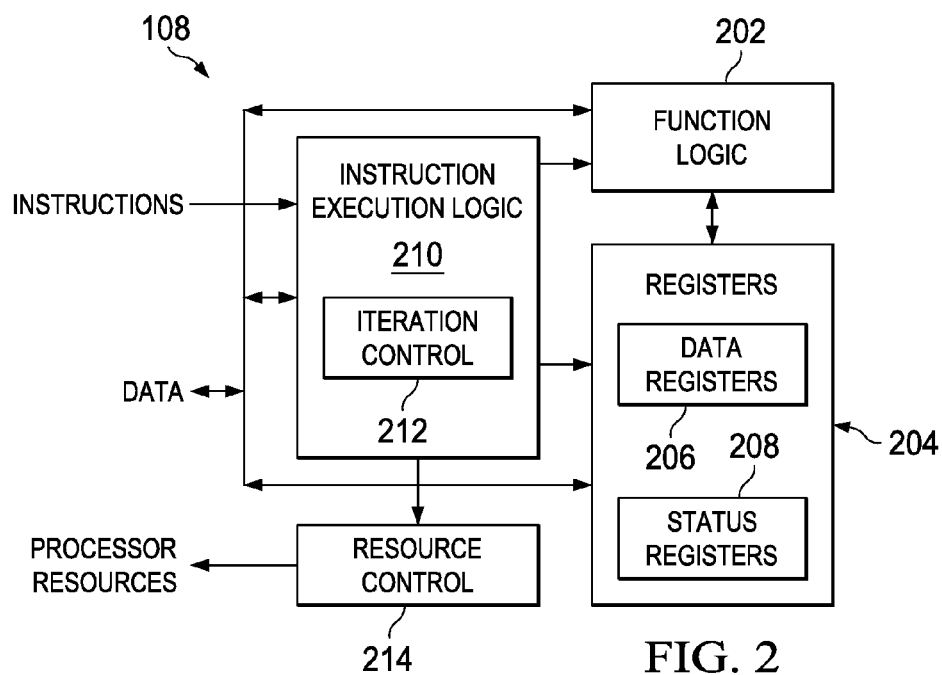
FIG. 2 shows a block diagram for an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202. The number and/or size of registers included in the data registers 206 may vary across embodiments. For example, one embodiment may include 16 16-bit data registers, and another embodiment may include a different number and/or width of registers. The status registers 208 include one or more registers that store state information produced by operations performed by the function logic 202 and/or store instruction execution and/or execution unit state information. State information stored in a status register 208 may include a zero result indicator, a carry indicator, result sign indicator, overflow indicator, interrupt enable indicator, instruction execution state, etc.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108.

The instruction execution logic 210 includes iteration control logic 212 that manages repetitive execution of one or more instructions provided to the instruction execution logic 210. When the instruction execution logic 210 receives a given instruction for execution, the iteration control logic 212 may examine the instruction and determine whether the instruction is to be executed only once, or is to be executed multiple times. Based on the determination, the iteration control logic 212 can direct the repetitive execution of the instruction. The iteration control logic 212 may also include logic that allows for nested execution of repeated instructions. For example, a first instruction may specify that the first instruction and additional instructions including a specified number of instructions subsequent to the first instruction be repeatedly executed, while a second instruction among the additional instructions also specifies repeated execution. Thus, the second instruction forms a nested loop relative to the looping construct formed by the first instruction. Embodiments of the iteration control logic 212 may support any number of such nested iterative instruction executions.

The iteration control logic 212 may also control initiation of instruction execution, repetitive or non-repetitive execution, based on an event or condition specified via the instruction. An event may be, for example, a signal and/or edge state (rising or falling) generated by different execution unit or other component of the processor 100. A condition may represent values of one or more states of the processor 100, such as values of execution unit status or status of other components of the processor 100, register values, etc. The instruction may indicate a source of an event or condition that initiates execution, a delay to apply before initiating execution following detection of an event, conditions to be met, and/or a multi-event sequence that must occur to initiate execution. In some embodiments, the conditions and events/event sequence used to trigger execution may change prior to execution of the instruction. The instruction may also indicate whether the iteration control logic 212 is to generate an acknowledgement signal, and the timing thereof (e.g., at event detection, at execution initiation, at execution termination, after N iterations, etc.) responsive to execution of the instruction or an event that initiates execution of the instruction.

Similarly, the iteration control logic 212 may control termination of repetitive instruction execution based on an event or condition specified via the instruction. The instruction may indicate a source of a termination event or condition. Applicable termination events/conditions include: signals/conditions generated by hardware external to the execution unit 108, values generated by instructions executed by an execution unit 102-108, execution of a specified instruction, etc. The instruction may indicate whether the iteration control logic 212 is to generate a trigger signal to initiate operation of or provide notification to a different execution unit or component of the processor, and the destination and timing thereof (e.g., prior to termination of execution, at execution initiation, at execution termination, after N iterations, etc.). The trigger signal may include information such as identification of a component receiving the signal, action to perform based on the signal, timing of action based on reception of the signal, expectation of acknowledgement and timing thereof, etc.

Based on information derived from the instruction, the iteration control logic 212 may cause the instruction to be executed a number of times that is determined prior to the first iteration of the instruction. Alternatively, the iteration control logic 212 may initiate iterative execution where the number of iterations to be executed is indeterminate at initiation of execution and determined after initiation of execution. In such a case, iterative execution may be terminated based on an event or condition as explained above (e.g., signal level, signal transition, status change, etc.).

Figure 3A:
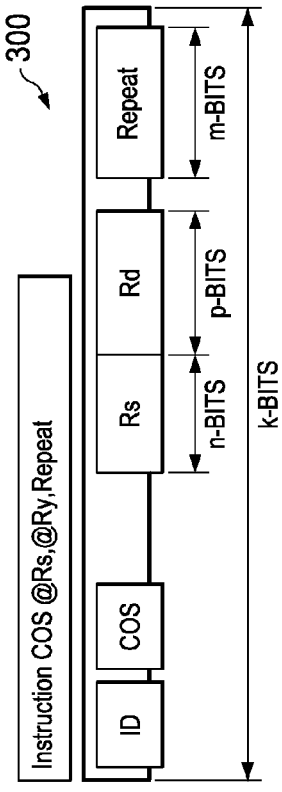
FIGS. 3A-3C show exemplary instructions that include instruction iteration information in accordance with various embodiments.
Figure 3B:
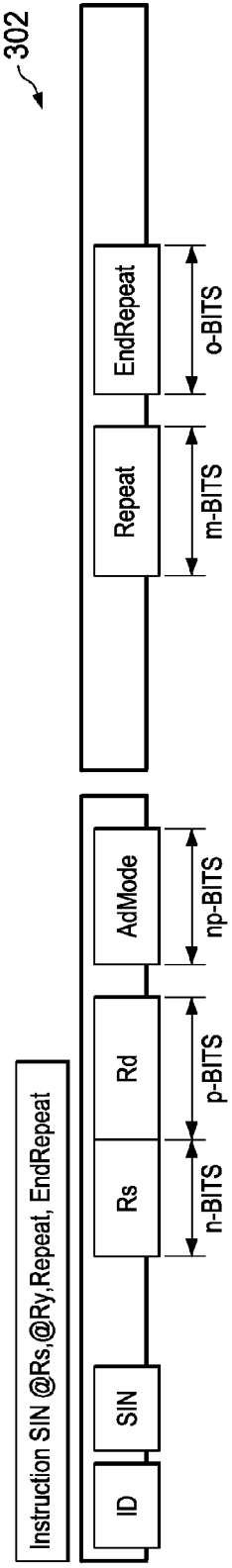
Figure 3C:
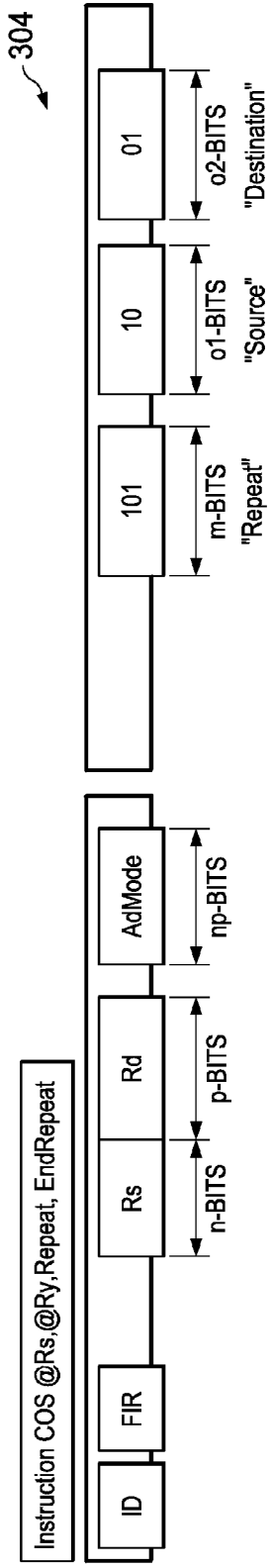

An instruction may convey, to the instruction execution logic 210, information indicative of the number of iterations of the instruction to be executed, and associated execution control information, in a variety of ways. FIGS. 3A-3C show exemplary instructions that include instruction iteration information in accordance with various embodiments. Other instruction embodiments may include the various iteration, initiation, termination, trigger, and other information disclosed herein in a different number of fields and/or in a different arrangements of fields. In FIG. 3A, the instruction 300 includes a REPEAT field. The REPEAT field carries information that directly or indirectly specifies one or more of a number of times the instruction is to be executed, conditions for initiation of instruction execution, conditions for termination of instruction execution, generation and content of triggering signals, and/or other operations disclosed herein. Thus, in the instruction 300, the information may be expressly provided via the REPEAT field, or the REPEAT field may specify a location, such as a register or memory location, where the iteration, triggering, etc. information is located.

The information described above with regard to the REPEAT field of the instruction 300 may be provided via any number of fields in various embodiments of the instructions executed by the execution units 102-108. In FIG. 3B, the instruction 302 includes a REPEAT field and an ENDREPEAT field. The ENDREPEAT field may carry information that directly or indirectly (e.g., via pointer) specifies events, conditions, etc. on which the execution unit is to terminate iterative execution of the instruction 302. The REPEAT field may directly or indirectly specify a number (one or more) of instruction iterations to be executed and/or execution initiation conditions, etc.

FIG. 3C shows an instruction 304 that includes a REPEAT field, SOURCE field, and a DESTINATION field. The SOURCE and DESTINATION fields may include trigger event source and destination information that may be included in different fields of other instruction embodiments. For example, the information specified via the DESTINATION field of instruction 304 may be included in the REPEAT field of the instruction 302. More specifically, the SOURCE field may contain information that directly or indirectly specifies a source of a trigger event and/or condition applied by the iteration logic 212 to initiate and/or continue execution of the instruction 304. The DESTINATION field may contain information that directly or indirectly specifies a destination of a trigger event and/or condition generated by the execution unit based on execution of the instruction 304. The REPEAT field may directly or indirectly specify a number (one or more) of instruction iterations to be executed, a number of additional instructions to be iterated with the instruction, etc.

Figure 4:
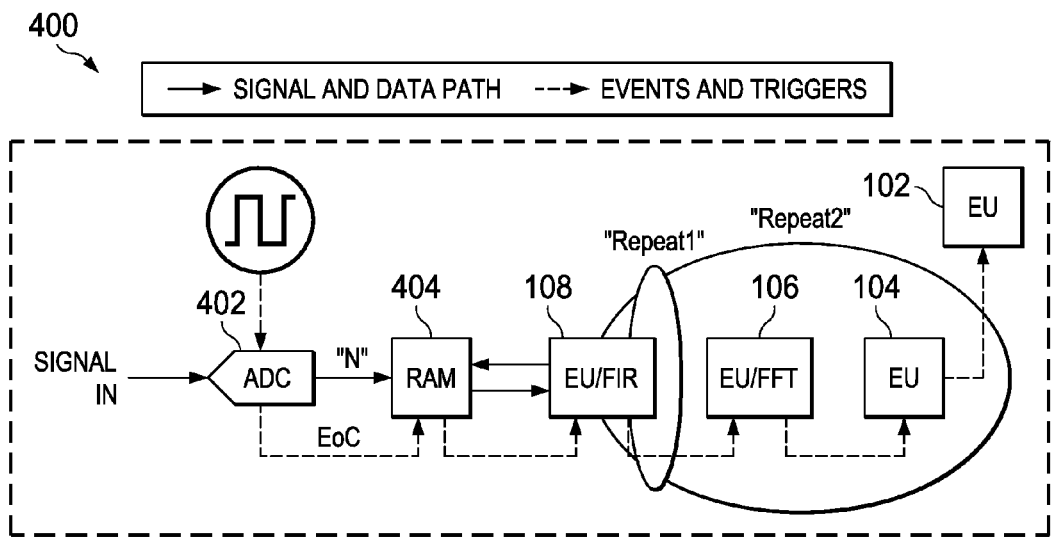
FIG. 4 shows a block diagram for a signal processing system including execution units in accordance with various embodiments.

FIG. 4 shows a block diagram for a signal processing system 400 including execution units in accordance with various embodiments. The system 400 may include or be implemented in an embodiment of the processor 100. The system 400 includes an analog-to-digital (ND) converter 402, a memory 404, and one or more execution units 102-108. The system 400 may also include other components that have been omitted from FIG. 4 in the interest of clarity. In the system 400, the ND converter 402 digitizes an input signal and stores the digitized signal samples in the memory 404. The execution unit 108 is executing a FIR instruction with iteration to generate a filtered sample. Iterative execution of the FIR instruction by the execution unit 108 is triggered by the availability of a sample in the memory 404. Thus, the execution unit 108 may operate in a low-power state until a sample is available and the FIR instruction is triggered.

When execution of the FIR instruction(s) by the execution unit 108 is complete (or at a time specified by the FIR instruction), the execution unit 108 generates a trigger event that is detected by the execution unit 106. The execution unit 106 is executing an FFT instruction with iteration to transform the filtered data to the frequency domain. On detection of the trigger event generated by the execution unit 108, the execution unit 106 initiates execution of the FFT instruction. Thus, the execution unit 106 may operate in a low-power state until the trigger event generated by execution of the FIR instruction is detected and FFT instruction execution is initiated.

When execution of the FFT instruction by the execution unit 106 is complete (or at a time specified by the FFT instruction), the execution unit 106 generates a trigger event that is detected by another execution unit (e.g., execution unit 104) configured to provide processing of the frequency domain data generated by the execution unit 106. The execution unit 104 may initiate iterative execution of one or more instructions responsive to the trigger event. The final execution unit processing the data from the memory 404 may generate a trigger event to an execution unit 102 which may operate a central control or management unit for the processor 100.

Thus, embodiments of the execution units 102-108 employ iterative instruction execution with triggering to provide autonomous processing where each execution unit 102-108 is independently activated for only the duration required to execute a specific instruction. In this way, embodiments of the processor 100 provide reduced power consumption relative to other processor architectures.

In some embodiments of a signal processing system, rather than executing functions, such as the FIR and FFT, in different execution units as described above with regard to the system 400, the functions may be executed in a single execution unit 108. In such a system, execution of the FIR instruction may not be triggered until execution of the FFT instruction is complete (i.e., the FFT instruction is atomically executed). As in the system 400 a RAM buffers input data for processing by the FIR instruction. When a predetermined number of samples have been stored in the RAM, a flag, interrupt, or other signal is generated indicating that FIR execution may proceed. FFT execution may be initiated by a trigger signal generated by the FIR instruction responsive to generation of a predetermined number of filtered samples.

Figure 5:
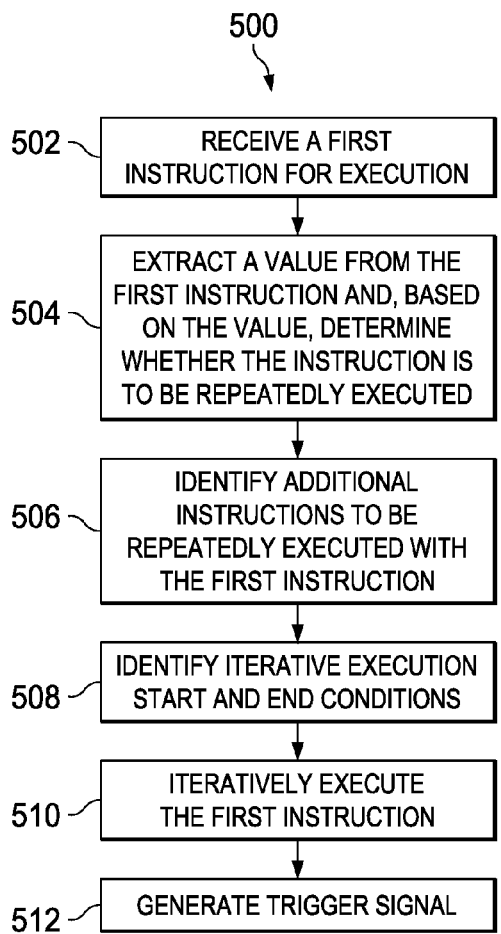
FIG. 5 shows a flow diagram for a method for executing an instruction by a processor in accordance with various embodiments.

FIG. 5 shows a flow diagram for a method 500 for executing an instruction by a processor in accordance with various embodiments. Though depicted sequentially as a matter of convenience, at least some of the actions shown can be performed in a different order and/or performed in parallel. Additionally, some embodiments may perform only some of the actions shown.

In block 502, an instruction is issued to an execution unit (e.g., execution unit 104) of the processor 100 for execution. The instruction may be a complex instruction, such as an FFT, that requires many instruction cycles to execute.

In block 504, the execution unit 104 analyzes the instruction, and extracts from the instruction a value that directly or indirectly indicates whether the instruction is to be repeatedly executed. In some embodiments, the value may expressly define a number of iterations of the instruction to be executed, a condition/event terminating instruction iteration, a condition/event that initiates or maintains iterative execution etc. In other embodiments, the value may indicate a location containing iterative execution parameters such as are disclosed herein.

If the execution unit 104 determines that the instruction is to be repeatedly executed, then, in block 506, the execution unit 104 identifies additional instructions that are to be repeatedly executed in conjunction with the instruction. For example, a field of the instruction may directly or indirectly indicate a number of subsequent instructions to be iteratively executed in conjunction with the instruction.

In block 508, the execution unit 104 identifies conditions and/or events to be used to start and/or end iterative execution of the instruction. For example, information directly or indirectly specified by the instruction may indicate that the instruction is to be executed immediately, or may indicate that execution of the instruction is to be initiated only on detection of a specified event or condition in the processor 100. Termination of execution may be similarly specified. For example, execution may end after a specified number of iterations or on detection of a specified event or condition in the processor 100.

In block 510, the execution unit 104 iteratively executes the instruction and any additional instructions specified to be iteratively executed with the instruction. As explained above, execution initiation may be immediate or predicated on detection of a specified event and/or condition generated by hardware or instructions in the processor 100 or external to the processor 100. If initiation of execution is triggered by an event or condition, then the execution unit 104 monitors for the presence/occurrence of the initiation event or condition. The instruction may be executed for a fixed number of iterations or an indeterminate number of iterations where execution is terminated based on detection of an event or condition generated by hardware or instructions in the processor 100 or external to the processor 100. If termination of execution is triggered by an event or condition, then the execution unit 104 monitors for the presence/occurrence of the termination event or condition.

In block 512, the execution unit 104 generates a trigger signal based on the execution of the instruction. The instruction may directly or indirectly specify the nature, timing, content, etc. of the trigger signal. For example, the instruction may specify that a trigger signal be directed to the execution unit 102 at initation, termination, or iteration N of instruction execution.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
a plurality of execution units, at least one of the execution units configured to:
repeatedly execute an instruction based on a field of the instruction indicating that the instruction is to be iteratively executed,
wherein the at least one execution unit is configured to suspend execution of the instruction until an initiation event is detected by the at least one execution unit, and wherein the field defines the initiation event.

2. The processor of claim 1, wherein the field comprises at least one of:
a value indicating a number of times that the instruction is to be iteratively executed; and
indicia of a location storing a value indicating a number of times that the instruction is to be iteratively executed.

3. The processor of claim 1, wherein the instruction is a first instruction, wherein the field is a first field, and wherein the at least one execution unit is further configured to:
repeatedly execute a second instruction in conjunction with the repeated execution of the first instruction; and
identify the second instruction based on a second field of the first instruction.

4. The processor of claim 1, wherein the initiation event is at least one of:
execution of an instruction specified by the field;
detection of a condition specified by the field; and
detection of a signal value specified by the field.

5. The processor of claim 1, wherein the at least one execution unit is configured to delay execution of the instruction until expiration of a programmable time interval after the initiation event is detected.

6. The processor of claim 1, wherein the at least one execution unit is configured to generate an acknowledgement signal responsive to detection of the initiation event.

7. The processor of claim 1, wherein the at least one execution unit is configured to repeatedly execute the instruction until a termination event is detected by the at least one execution unit, and wherein the field defines the termination event.

8. The processor of claim 7, wherein the termination event is at least one of:
execution of an instruction specified by the field;
detection of a condition specified by the field; and
detection of a signal value specified by the field.

9. The processor claim 1, wherein the at least one execution unit is configured to:
generate a trigger signal based on the repeated execution of the instruction;
wherein the field defines at least one of:
a destination of the trigger signal; and
a generation time of the trigger signal.

10. The processor of claim 9, wherein the trigger signal comprises information specifying at least one of:
a receiver of the trigger signal;
an action to be taken by the receiver of the trigger signal;
a timing of the action to be taken by the receiver of the trigger signal; and
generation of an acknowledgement signal.

11. An execution unit for executing instructions in a processor, the execution unit comprising:
instruction execution logic configured to:
extract a value from a first instruction to be executed by the execution unit;
determine based on the value whether the first instruction is to be repeatedly executed;
identify a second instruction to be repeatedly executed in conjunction with the first instruction based on a field of the first instruction; and
repeatedly execute the first and second instructions as part of a single looping construct based on a result of the determination.

12. The execution unit of claim 11, wherein the execution unit is configured to interpret the value as at least one of:
indicia of a number of times that the first instruction is to be iteratively executed; and
indicia of a location storing a value indicating a number of times that the first instruction is to be iteratively executed.

13. The execution unit of claim 11, wherein the field is a first field, and wherein the execution unit comprises at least one of:
logic configured to initiate the execution of the first instruction based on detection of an initiation event by the execution unit, wherein a second field of the first instruction defines the initiation event; and
logic configured to terminate the execution of the first instruction based on detection of a termination event by the execution unit, wherein the second field defines the termination event.

14. The execution unit of claim 13, wherein the initiation event and the termination event comprise at least one of:
execution of an instruction specified by the second field;
detection of a condition specified by the second field; and
detection of a signal value specified by the second field.

15. The execution unit of claim 13, wherein the execution unit is configured to generate an acknowledgement signal responsive to detection of the initiation event.

16. The execution unit of claim 11, wherein the field is a first field, and wherein the execution unit is configured to:
generate a trigger signal based on the repeated execution of the first instruction;
wherein a second field of the first instruction defines at least one of:
a destination of the trigger signal; and
a generation time of the trigger signal.

17. The execution unit of claim 16, wherein the execution unit is configured to include, in the trigger signal, information specifying at least one of:

a receiver of the trigger signal;
an action to be taken by the receiver of the trigger signal; and
a timing of the action to be taken by the receiver of the trigger signal.

18. A method for executing instructions in an execution unit of a processor, comprising:
extracting, by the execution unit, a value from an instruction to be executed by the execution unit;
determining, by the execution unit, based on the value, whether the instruction is to be repeatedly executed;
repeatedly executing, by the execution unit, the instruction based on a result of the determining; and
generating a trigger signal based on the repeated execution of the instruction,
wherein a field of the instruction defines at least one of: a destination of the trigger signal, and a generation time of the trigger signal.

19. The method of claim 18, further comprising interpreting the value to be at least one of:
indicia of a number of times that the instruction is to be iteratively executed; and
indicia of a location storing a value indicating a number of times that the instruction is to be iteratively executed.

20. The method of claim 18, wherein the instruction is a first instruction, and wherein the field is a first field, the method further comprising:
identifying a second instruction based on a second field of the first instruction; and
repeatedly executing the second instruction in conjunction with the repeated execution of the first instruction.

21. The method of claim 18, wherein the field is a first field, the method further comprising at least one of:
initiating the execution of the instruction based on detection of an initiation event by the execution unit, wherein a second field of the instruction defines the initiation event; and
terminating the execution of the instruction based on detection of a termination event by the execution unit, wherein the second field defines the termination event.

22. The method of claim 21, wherein the initiation event and the termination event comprise at least one of:
execution of an instruction specified by the second field;
detection of a condition specified by the second field; and
detection of a signal value specified by the second field.

23. The method of claim 21, further comprising generating an acknowledgement signal responsive to detection of the initiation event.

24. The method of claim 18, further comprising including in the trigger signal information specifying at least one of:
a receiver of the trigger signal;
an action to be taken by the receiver of the trigger signal; and
a timing of the action to be taken by the receiver of the trigger signal.

* * * * *